G. STAATS
AUTOMATIC VALVE FOR FLUSH TANKS.
APPLICATION FILED SEPT. 8, 1916.

1,262,710.

Patented Apr. 16, 1918.

WITNESSES:
Frederick G. Kimlin.
Louis A. Fitzer.

INVENTOR.
George Staats
BY E. F. Gennert
ATTORNEY

UNITED STATES PATENT OFFICE.

GEORGE STAATS, OF BROOKLYN, NEW YORK.

AUTOMATIC VALVE FOR FLUSH-TANKS.

1,262,710.

Specification of Letters Patent.

Patented Apr. 16, 1918.

Application filed September 8, 1916. Serial No. 118,989.

*To all whom it may concern:*

Be it known that I, GEORGE STAATS, a citizen of the United States, and resident of the borough of Brooklyn, in the county of Kings, city and State of New York, have invented certain new and useful Improvements in Automatic Valves for Flush-Tanks, of which the following is a specification.

This invention relates to automatic valves and especially to that class used on flush tanks, and the object of the same is to mount the valve and float on a base which may be secured within the tank and at the outlet and can be easily removed to make repairs or alterations without disconnecting the other parts of the tank.

These and other details and objects of the invention will be more fully described in the following specification, set forth in the claim and illustrated in the drawings forming a part of this application, and wherein:

A serious objection to valves for flush tanks as heretofore arranged has been their direct connection with pipes or couplings, and when repairs or removals are required it is generally necessary to disconnect the pipes, turn off the water and resort to a great deal of unnecessary work.

The present invention overcomes these objectionable features by mounting the valve, the float and a latch on a removable base which is secured at the outlet, so that all of these parts may be easily removed when necessary.

The tank, 1, may be of any desired size and type and be provided at its upper end with a lever, 2, playing through a slot and having a button at its outer end. The lever is pivoted in a bracket, 3, and at its inner end, 3', carries the rod, 4, having the valve stem, 5, at its lower end.

The outlet consists of the body, 6, having the valve seat, 6', at one end and the opening 6² for the overflow pipe, 7, in the other end while at its lower side is the nipple, 6³ to which is coupled the flush pipe, 8.

Around the valve seat 6' is a threaded flange 6⁴, and a bail, 9, having a perforated hub, 9', is secured to a collar, 9², which is threaded to fit about the flange, 6⁴, the hub, 9', acting as a bearing for the valve stem, 5, that is provided with a conical flange, 5', above the said bearing.

A latch, 10, with a nose, 10', to engage the lower side of the flange, 5', and ride over the inclined upper side, is pivoted in a bracket, 11, encircling the hub, 9', and having a set screw, 12, to secure it at any desired position around the stem, 5. The lower end of the stem, 5, is enlarged to fit the perforation in the hub, 9', and threaded, and carries the valve, 13, located between a plate, 14, and the nut, 15, while the latch, 10, is pivoted by means of the pin, 16, in the ears, 17, of the bracket, 11, and is provided with the outwardly extending rod, 18, having the float 19 at its end.

Figure 1:
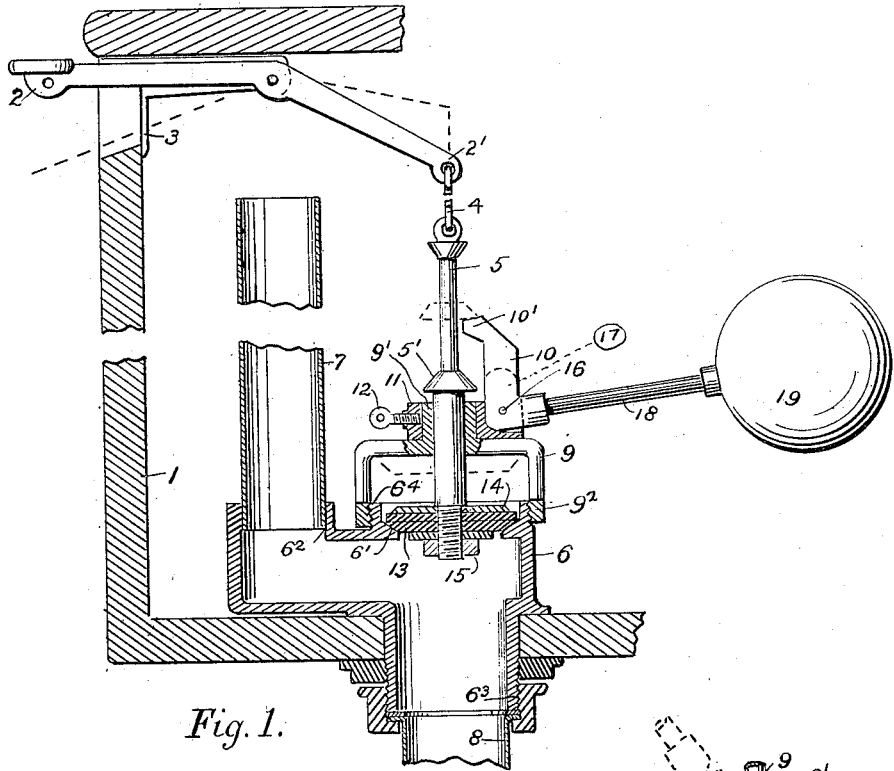
Figure 1 is a sectional view through one end of a flush tank showing the valve closed but with its open position illustrated by dotted lines.
Figure 3:
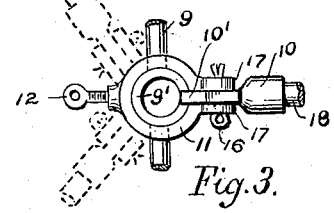
Fig. 3 is a plan view of the rotatative bracket to which the float lever is pivoted.
Figure 2:
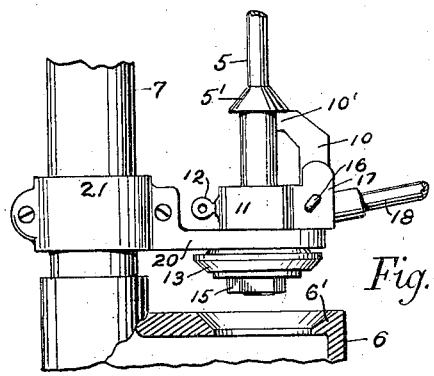
Fig. 2 shows a modified means for mounting the valve.

In the modified form of valve shown in Fig. 2 the bail is dispensed with and a bracket, 20, is clamped to the overflow pipe by means of straps, 21, at each side and having means for the sliding of the stem in a vertical direction. This view also shows the valve in its raised position and the latch, 10, engaging the collar, 5', to open the flush pipe and empty the tank; when the water sinks to a low level and the float descends, the latch 10 releases the collar 5' and the valve drops by gravity and the tank fills.

The valve is raised by means of the lever, 2, operated from the outside of the tank, and the nose, 10', yields as the collar, 5', passes upward but resumes its normal position and holds the collar and valve in their elevated positions until the water leaves the tank.

By loosening the screw, 12, and swinging around the bracket, 11, the float, 19, and its rod, 18, will clear any other parts of the tank or its details, and when it becomes necessary to remove the valve and float, the collar, 9², is unscrewed (or the straps, 21, are loosened) and the entire mechanism easily removed.

It is obvious that other modified means for carrying the valve, float and valve control means and detachably secured at the mouth of the flush pipe may be resorted to in carrying out this invention without departing from the essential features above referred to or from the scope of the appended claim.

What I claim is:

In an automatic valve, the combination with a tank, of a body having an opening, an overflow pipe, a flush pipe, a detachable support above said opening, a valve guided by the support, a collar laterally and vertically adjustable on said support, a bell-crank on the collar, and a float having its stem attached to one arm of the bell-crank for controlling the valve.

Signed at New York city in the county of and State of New York, August A. D. 1916.

GEORGE STAATS.

Witness:
CHARLES V. DWYER.

Copies of this patent may be obtained for five cents each, by addressing the "Commissioner of Patents, Washington, D. C."